UNITED STATES PATENT OFFICE.

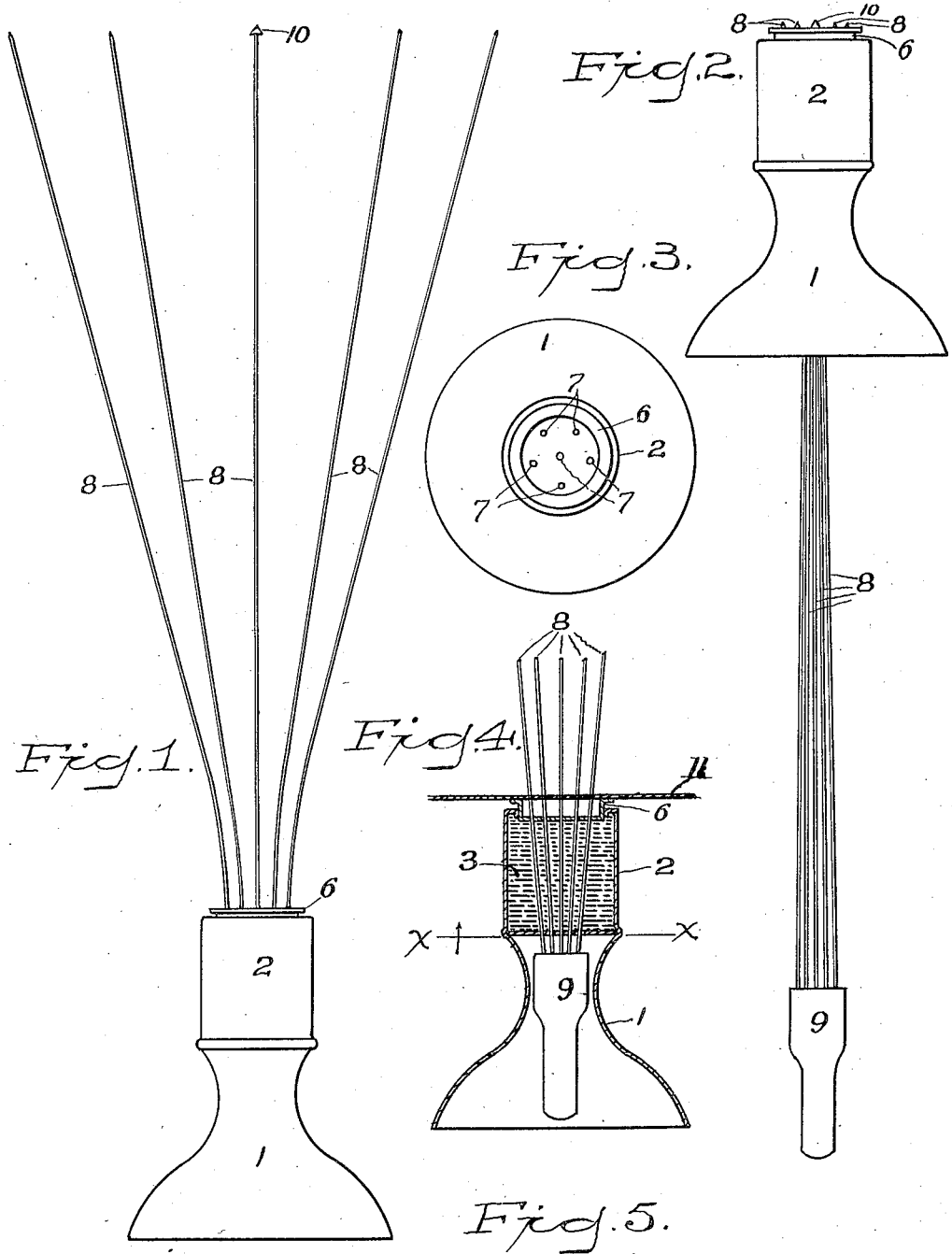

GUSTAVE HELLWIG AND MATHIAS LAGELBANER, OF BRIDGEPORT, CONNECTICUT.

FLY-CATCHER.

1,092,361.  Specification of Letters Patent.  Patented Apr. 7, 1914.

Application filed May 16, 1913. Serial No. 767,979.

*To all whom it may concern:*

Be it known that we, GUSTAVE HELLWIG and MATHIAS LAGELBANER, both citizens of the United States, residing in the city of Bridgeport, county of Fairfield, State of Connecticut, have invented certain new and useful Improvements in Fly-Catchers; and we do declare the following to be a full, clear, and exact description of the invention, such as will enable others skilled in the art to which it appertains to make and use the same.

Our invention relates to fly catchers and has for its object to provide a very simple and efficient device of this nature, and consists in the details of construction and arrangement of parts hereinafter fully described and then particularly pointed out in the claim which concludes this description.

In the drawings Figure 1 is an elevation of our improvement in its normal or operative position; Fig. 2 an elevation showing the resilient wires retracted; Fig. 3 a plan view with the wires removed; Fig. 4 a vertical sectional elevation with the wires broken away, the wires being shown equipped with a cleaner, or insect remover, and Fig. 5 is a section at the line $x$, $x$, of Fig. 4 with the wires removed.

Similar numerals of reference denote like parts in the several figures of the drawing.

Our invention is intended as an improvement on the construction shown and described in Letters Patent No. 1,019,008, issued February 27, 1912. In this patented device the reservoir and the base are separate and movable one from the other, and this construction has been found clumsy and inconvenient in manipulation.

Our present improvement contemplates a reservoir and base that are rigidly secured together and therefore have no relative movement, while the base itself is hollow and houses a handle to which the lower ends of the resilient wires are directly secured instead of being fastened to the base as in the patented device.

Referring to the drawings, 1 is a hollow base which supports a reservoir 2 adapted to contain some suitable glutinous or sticky substance indicated by the numeral 3. This base and reservoir are rigidly secured together so that they can have no relative movement.

The bottom 4 of the reservoir contains perforations 5, and a removable cap or cover 6 is provided for the reservoir which contains perforations 7.

8 are resilient wires which extend through the perforations 5 and 6 and also through the glutinous material 3, and the lower extremities of these wires are secured to a suitable handle 9 at a point immediately below the bottom 4 of the reservoir, this handle being normally housed within the hollow base 1 as shown at Fig. 4. These wires diverge from the handle 9 and in normal condition extend upwardly from the cover 6 as shown at Fig. 1. In utilizing our improvement the handle 9 is withdrawn from the base, thereby retracting the wires 8 and causing them to pass through the glutinous matter 3, and the handle is then restored to normal condition, so that the wires will extend as shown at Fig. 1, and these wires will then be thoroughly coated with glutinous material. Flies or other insects are readily attracted by the wires and will stick thereto and whenever it becomes necessary to clean the device the handle is withdrawn thereby wiping the wires clean as they pass through the perforations 7 in the cover and the latter is then readily cleansed. One of the wires 8 may be provided with a small head 10 so that the series of wires cannot be withdrawn entirely from the cover. If desired, a piece of paper, indicated by the numeral 11 at Fig. 4, may be placed over the cover after the wires have been retracted and when such wires have been restored to normal condition they will perforate the paper, and thereafter these wires will clean themselves against the paper which latter may be thrown away or destroyed, thereby rendering it unnecessary to clean the cover itself.

Having thus described our invention what we claim as new and desire to secure by Letters Patent is:—

An insect catcher comprising a hollow base open at its bottom and forming a handle housing, a reservoir carried by the top of the base and having a perforated top and bottom, insect-catching arms projecting through the perforated top and bottom and slidable through the reservoir, and a handle for operating the arms adapted to be inclosed within the housing.

In testimony whereof we affix our signatures in presence of two witnesses.
GUSTAVE HELLWIG.
MATHIAS LAGELBANER.

Witnesses:
F. W. SMITH, Jr.,
M. T. LONGDEN.